United States Patent [19]
Willman

[11] Patent Number: 5,457,795
[45] Date of Patent: Oct. 10, 1995

[54] METHOD AND APPARATUS FOR SHARING AND TRANSFERRING DATA BETWEEN SOFTWARE PROGRAMS

[76] Inventor: Todd J. Willman, P.O. Box 270, Woodsfield, Ohio 43793

[21] Appl. No.: 252,249

[22] Filed: Jun. 1, 1994

[51] Int. Cl.$^6$ .............................. G06F 13/14; G06F 9/00; G06F 15/00
[52] U.S. Cl. .......................... 395/600; 395/650; 395/853; 364/DIG. 1; 364/282.1; 364/283.1; 364/283.3
[58] Field of Search ...................................... 395/650, 600, 395/275; 364/DIG. 1

[56] References Cited

U.S. PATENT DOCUMENTS

| | | | |
|---|---|---|---|
| 4,674,055 | 6/1987 | Ogaki et al. | 364/479 |
| 4,941,088 | 7/1990 | Shaffer et al. | 364/200 |
| 5,088,034 | 2/1992 | Ihara et al. | 395/700 |
| 5,155,837 | 10/1992 | Liu et al. | 395/500 |
| 5,257,369 | 10/1993 | Skeen et al. | 395/650 |

*Primary Examiner*—Thomas G. Black
*Assistant Examiner*—Jean R. Homere
*Attorney, Agent, or Firm*—Carothers & Carothers

[57] ABSTRACT

A system for establishing a circuit between software programs such that applicable data is automatically transferred between programs and all attributes shown on a single common circuit data interface using unique data files on the hard disk storage area of a general data processor. For a given circuit file type, a global file is used as a data holding tank for storing and displaying all attributes determined or modified by each program in the circuit. A command button is used to create a connection between all the programs in the circuit using a switch file in the local path of each program. A data file is also written that has a code to reference each local data item to the global file. This data is automatically retrieved when this data is determined or modified by the active program in the circuit and control is passed back to the single common circuit data interface. The global file then summarizes all the attributes for a particular item in one file, and makes the current file data available to any other circuit programs that are then selected. This process of sharing data between software programs allows the circuited software programs to perform as one.

2 Claims, 5 Drawing Sheets

Flowchart of the Sharing and Transfer of Data between Software Programs

Figure 1: File Formats for Circuiting Data Between Software Programs

Circuit.PRG (1)
"ListPRG1", "PathName1"
"ListPRG2", "PathName2"
"ListPRGn", "PathNamen"

Program list file for creating the Circuit Program list box using the ListPRG for each circuit program. The Pathname is then associated with each item in the list box to identify the location of the selected circuit program for data transfer purposes. This is a global file that reside in the Zergét directory or folder.

Circuit.FIL (2)
"ListFIL1", "FileType1"
"ListFIL2", "FileType2"
"ListFILn", "FileTypen"

Circuit File list file for creating the Circuit File Type list box using the ListFIL of each available file type of the selected circuit program. The FileType is used to then display the available circuit files in the currently selected data directory or folder. A unique Circuit.FIL file must reside in the PathName of the circuit program that is selected for each file type supported; the Circuit File Type list box displays the ListNames available.

Attribute.XYZ (3)     "FileName".XYZ (4)
"ListATR1"                "ListName1", "Value1"
"ListATR2"                "ListName2", "Value2"
"ListATRn"                "ListNamen", "Valuen"

The Attribute.XYZ file is a global file for creating the Circuit File Attribute list box using the ListATR's available for the selected "FileName".XYZ of file type XYZ. The "FileName".XYZ file selected from the Circuit File Name list box or opened as a new file from the File menu is a global data file used as a data holding tank for storing all of the current circuit data.

Circuit.XYZ (5)
CodeNum1, "Value1"
CodeNum2, "Value2"
CodeNumn, "Valuen"

Decoding and storage file that references the location of each line item and its current data value in relation to the global "FileName".XYZ data file so that the new data values from Circuit.XYZ can be placed into the correct position of "FileName".XYZ by Zergét.

Circuit.SWT (6)
Switch, "FileType", "ZergétPath"

Switch file that identifies if the circuit is connected and the FileType being circuited so that the correct Circuit.XYZ file can be loaded by the circuit program if it is connected. This local file exists in the path of each circuit program and is read by the circuit program each time it is loaded or activated. The "ZergétPath" is utilized to activate or load the Zergét Circuit when the current circuit program is deactivated or unloaded.

Figure 2a: Process of Circuiting Data Between Software Programs

A. Open Zergét Circuit, Load Circuit.PRG file
Sub LoadPRG
Open "Circuit.PRG" for input as #1
x=1: ZDIR$ = CurDir
While Not EOF(1)
NumPRG=x
Input #1, ListPRG$(x)
ProgramList.Additem ListPRG$(x)
Input #1, PathName$(x)
x=x+1
Wend: Close #1:End Sub

B. Select Circuit Program, Load Circuit.FIL file
Sub ProgramList_Click
NamePRG$ = ProgramList.Text
For x=1 to NumPRG
If NamePRG$ = ListPRG(x) then PRG = x
Next x
ChDir PathName$(PRG)
Open "Circuit.FIL" for input as #1
x=1:While Not EOF(1)
NumFIL=x
Input #1, ListFIL$(x), FileType$(x)
FileTypeList.Additem ListFIL$(x)
x=x+1
Wend: Close #1
FileTypeList.Additem ListFIL$(NumFIL)
End Sub

D. Load or Select "FileName".XYZ file
Sub FileNameList_Click
FileName$ = FileNameList.Text
ChDir DefaultData$ (assigned by user)
Open FileName$ for input as #1
x=1
While Not EOF(1)
Input #1, ListName$(x), AttValue$(x)
x=x+1
Wend: Close #1: End Sub

C. Select File Type & load Attribute.XYZ file
Sub FileTypeList_Click
NameFIL$=FileTypeList.Text
For x=1 to NumFIL
If NameFIL$ = ListFIL$(x) then FIL = x
Next x
TYP $= FileType$(FIL)
Attribe.TYP$ = "Attribe." + TYP$
Open Attribe.TYP$ for input as #1
x=1:While Not EOF(1)
ChDir ZDIR$: NumAtt = x
Input #1, ListATR$(x)
AttributeList.Additem ListATR$(x)
x=x+1
Wend
AttributeList.Additem ListATR$(NumAtt)
Close #1:End Sub Step E., Figure 2b

Figure 2b: Process of Circuiting Data Between Software Programs

| | |
|---|---|
| E. Select Connect Circuit Button<br>Sub Command1_Click<br>For z=1 to NumPRG<br>ChDir PathName$(z): SWT = 1<br>Open "Circuit.SWT" for Output as #1<br>Write #1, SWT,TYP$<br>Close #1<br>Circuit.TYP$= "Circuit." + TYP$<br>Open Circuit.TYP$ for Input as #1<br>x=1: While Not EOF(1)<br>NumCode = x<br>Input #1, Code(x)<br>x=x+1<br>Wend: Close #1<br>Open Circuit.TYP$ for Output as #1<br>for y=1 to NumCode<br>Write #1, Code(y),<br>AttValue$(Code(y))<br>Next y<br>Close #1<br>Next z<br>End Sub | F. Load or Activate a Circuit Program<br>Sub Load<br>Open "Circuit.SWT" for Input as #1<br>Input #1, SWT,TYP$, ZDIR$<br>Close #1<br>If SWT = 0 then Exit Sub<br>Circuit.TYP$= "Circuit." + TYP$<br>Open Circuit.TYP$ for Input as #1<br>x=1:While Not EOF(1)<br>Input #1, Code(x), AttValue$(x)<br>NumCode = x<br>x=x+1<br>Wend:Close #1<br>(Assign AttValue$(x) within Circuit Program)<br>End Sub |
| H. Unload or Deactivate a Circuit Program<br>If SWT = 0 then Exit Sub<br>ChDir ZDIR$: [Activate or Load Zerget Circuit]<br>Sub Load (in Zerget Circuit)<br>For z=1 to NumPRG<br>ChDir PathName$(z)<br>Open "Circuit.SWT" for Input as #1<br>Input #1, SWT,TYP$<br>If SWT = 2 then DataPath$ = PathName$(z)<br>Next z<br>Close #1: ChDir DataPath$<br>Open Circuit.TYP$ for Input as #1<br>x=1:While Not EOF(1)<br>Input #1, Code(x), AttValue$(Code(x))<br>x=x+1<br>Wend:Close #1: ChDir ZDIR$<br>Command1_Click (assign new to Circuit.XYZ files)<br>End Sub | G. Change Attributes in Circuit Program<br>Sub ChangeAttribute<br>Open Circuit.TYP$ for Output as #1<br>For x=1 to NumCode<br>Write #1, Code(x), AttValue$(x)<br>Next x<br>Close #1<br>SWT = 2<br>Open "Circuit.SWT" for Output as #1<br>Write #1, SWT, TYP$, ZDIR$<br>Close #1: End Sub |

Figure 3: Zergét Circuit Interface for Circuiting Data Between Software Programs

1. Select a circuit program from Circuit Program list box and the Circuit File Type list box is updated.
2. Select file type from Circuit File Type list box and the Circuit File Attribute list box is updated.
3. Select a file from the Circuit File Name list box or load a newly created file.
4. Select the Connect Circuit button to connect all circuit programs to the circuit.
5. Activate or Load a circuit program and the current circuit data will appear in that program.

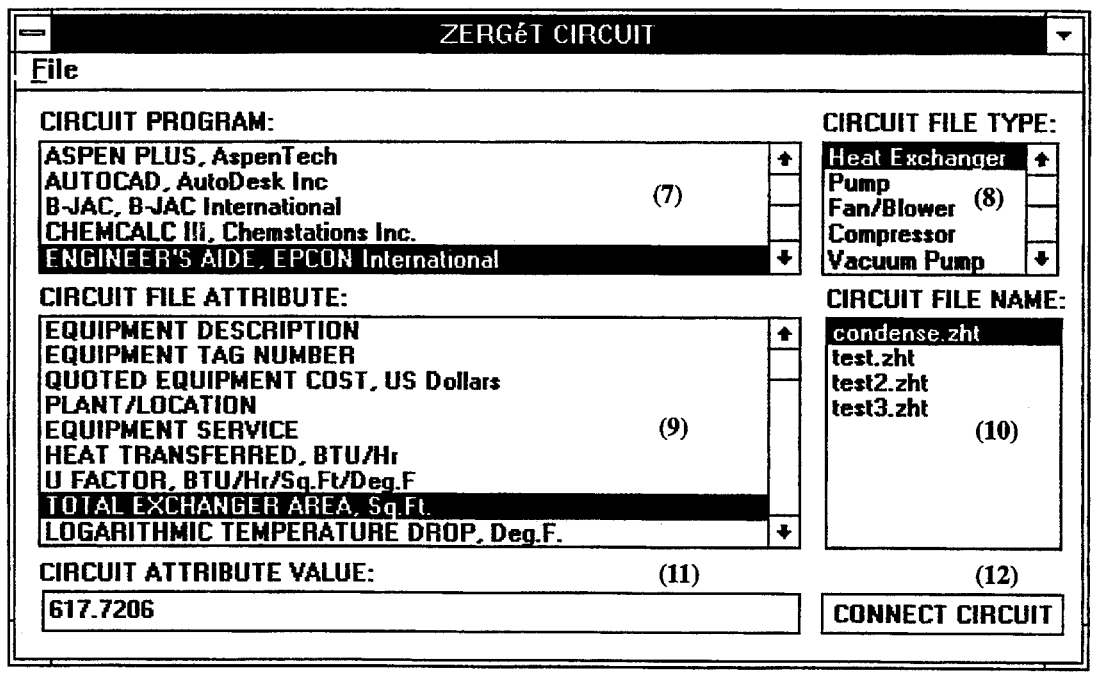

6. Change or modify the attributes in a circuit program and exit when completed.
7. The Zergét Circuit will retrieve the updated attributes and distribute these to all circuit programs.
8. Select any item in the Circuit File Attribute list box and the Circuit Attribute Value is displayed.
9. Choose another circuit program and the updated circuit data will appear in that program.
10. Printout or save the global circuit data file containing all attributes and values for the selected file.

Figure 4: Flowchart of the Sharing and Transfer of Data between Software Programs
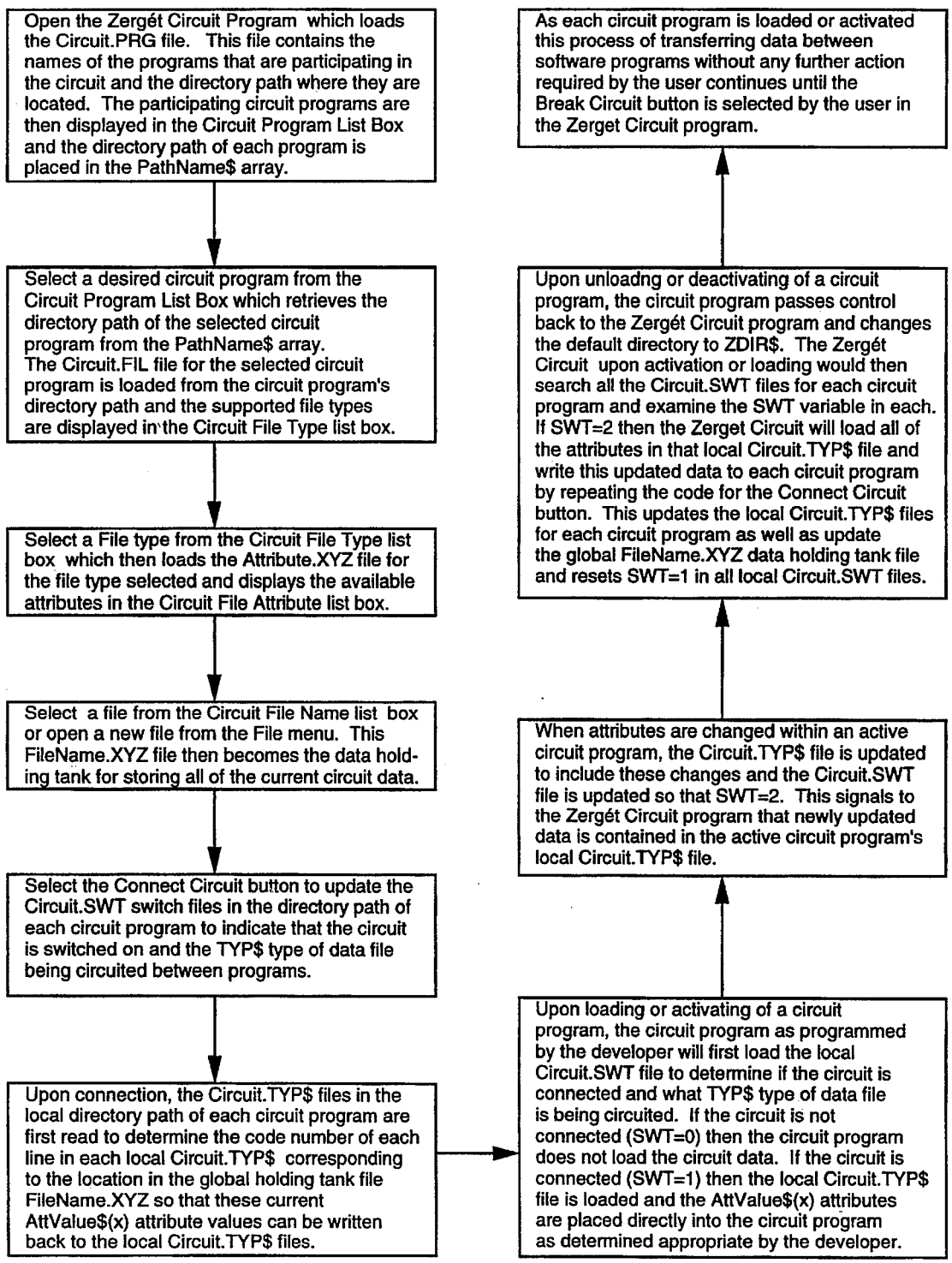

METHOD AND APPARATUS FOR SHARING AND TRANSFERRING DATA BETWEEN SOFTWARE PROGRAMS

BACKGROUND

1. Field of Invention

The present invention relates to the automatic transfer of data between software programs and more specifically to engineering software programs.

2. Prior Art

Presently, the transfer of data between software programs has been facilitated by the use of file conversion type software programs. However, file conversion software can not dynamically link programs together and require data format conversion between related software programs. The software of the present invention is designated with the trademark Zergét Circuit which derives its name and attributes from an ancient Hebrew word which means a crown, a frame, or a molding that draws all things into one. This invention involves the automatic sharing and transfer of data between the connected software programs in the Zergét Circuit to allow the connected software programs to perform as one.

Engineering software typically determines specific attributes for a given piece of process equipment. For example, a valve used to control the flow in a process system may require several software programs to be fully specified. One software program may be used to determine the flow that the valve is required to control. Another software program would then size the internal orifice size of the valve and determine the size and type of the actuator required. And, another software program would be used to specify the necessary materials of construction, and estimate the valve cost. The Zergét Circuit provides a means for capturing and transferring data between associated software programs that can utilize, modify, and update the attributes of the subject matter being specified. This enables all of the connected software programs within the Zergét Circuit to perform as one cohesive unit. The Zergét Circuit would also provide a common summary of all attributes assigned to the item being specified for accurate documentation and data communication.

SUMMARY OF THE INVENTION

Objects and Advantages

The Invention consists of a single common circuit data interface along with unique reference files to allow for the automatic transfer of data between connected software programs. This automatic data transfer is processed through the hard disk storage area of a generic data processor. The general data processor is a personal computer system designed to operate under the MSDOS®, Windows®, Macintosh®, or similar operating systems. The processor would consist of a display monitor, keyboard, mouse pointing device, printer, and central processing unit with random access memory, floppy disk drive, and hard disk drive. The single common circuit data interface contains a Circuit Program list box for selecting the circuit program and a Circuit File Type list box for selecting the circuit file type. For each file type, a unique Attribute.XYZ file is loaded and the list of available attributes are displayed in the Circuit File Attribute list box. As an attribute is selected in the Circuit File Attribute list box, its current value is displayed in the Circuit Attribute Value text field.

When the Connect Circuit button is selected, a Circuit.SWT file in the local directory or folder of each circuit program is modified. The Circuit.SWT file then indicates the connection state and the file type being connected. Location of the Circuit.SWT file for each circuit program is given by the path name in the Circuit.PRG file. Also, the Circuit.XYZ file for the specific file type XYZ is updated with the current information from the global "FileName".XYZ file. The "FileName".XYZ file acts as a data holding tank and is highlighted in the Circuit File Name list box when selected. The Circuit.XYZ file contains a reference attribute number for each attribute listed. This reference attribute number is used to update values in the "FileName".XYZ file for use by other circuit programs.

The design of the Zergét Circuit requires each participating circuit program in the Zergét Circuit to be able to read and write to a Circuit.XYZ file for each file type supported. Additionally, each circuit program must read the Circuit.SWT file when loaded or activated to determine the connection state and current file type. This provides the developer of the participating circuit program control over the process of developing compatibility with the Zergét Circuit. Also, there are no changes required in the Zergét Circuit source code since all the program path name, file type, and file attribute data is loaded from text files when the Zergét Circuit is initially loaded. The open ended format of the Attribute.XYZ files also allows further expansion without source code changes, as well.

A database for each participating circuit program is not created since this could be used to extract mass amounts of proprietary data and potentially reduce the need for a particular software program. Therefore, to protect the proprietary data of a participating software program, only one global data "FileName".XYZ file can be saved for each item type being analyzed by the Zergét Circuit. This "FileName".XYZ file is also referred to as the data holding tank.

A modern computer interface design including list boxes, pull-down menus, and command buttons is used in the single common circuit data interface. This allows the user to quickly become efficient in operation of this process system. These designs are found in many other commercial software packages that are commonly used on current graphical-based operating systems such as Microsoft Windows ®. These interface designs have proven to provide increased use and proficiency over single step keyboard entry systems as is used in earlier MSDOS® systems.

The advantage of using the Zergét Circuit versus the independent operation of software programs can be shown by a valve sizing example. Without the Zergét Circuit, the presence of a control valve to maintain a specific water flow is first identified in a process simulation software package. The flow and fluid property data for this valve would need to be re-entered into a valve sizing program to determine the specific valve body size required to meet the pressure drop requirements. The fluid data and valve pressure drop data would then need to be re-entered into an expert software program to determine the recommended valve type and material. This information would also need to be entered into an estimating software program to determine the valve cost. With the Zergét Circuit, the data would flow between each program without the need to re-enter the data. If process requirements needed to be changed or modified, the updating of the valve sizing, valve specifying, and valve estimating would be quickly accomplished with the Zergét Circuit. And, such changes to optimize the process system where the valve is utilized would not be resisted due to the amount of rework required.

BRIEF DESCRIPTION OF THE DRAWINGS

Other advantages of the invention become apparent upon reading the following detailed description and upon referral to the drawings of which:

FIG. 1 describes the various file format types required to create a connection between the circuit programs for automatic transfer of circuit file attributes.

FIG. 2 in the form of FIGS. 2a and 2b describes the process of circuiting data between software programs using the various circuit files described in FIG. 1.

FIG. 3 is a diagram which describes the single common circuit data interface to automatically share data between software programs.

FIG. 4 is a flow chart describing the steps involved in the data sharing and transfer between the software programs.

REFERENCE NUMERALS IN DRAWINGS

1 Circuit.PRG global program list file
2 Circuit.FIL local file type files
3 Attribute.XYZ global attribute files
4 "FileName".XYZ global data holding tank files
5 Circuit.XYZ local decoding and storage files
6 Circuit.SWT local switch files
7 Circuit Program list box
8 Circuit File Type list box
9 Circuit File Attribute list box
10 Circuit File Name list box
11 Circuit Attribute Value text field
12 Connect Circuit command button While the invention is susceptible to various modifications and alternative forms, a specific embodiment of the invention is described in detail below. This description is not intended to limit the invention to the particular form disclosed, but the invention is to cover all modifications and alternatives falling within the scope of the invention as defined by the claims below. Such modifications could include the use of different file structures to accomplish the same type of circuit connection, the use of single step data transfer to one circuit program at a time, the use of the Zergét Circuit for other types of software other than engineering software, etc.

DESCRIPTION OF PREFERRED EMBODIMENT

To accomplish the automatic transfer between software programs connected in a circuit, several unique data files are utilized as shown in FIG. 1. The Circuit.PRG 1 file contains the list names to be displayed in the Circuit Program list box 7 and the path name where each software program can be accessed. The Circuit.FIL 2 files are found in the local path of each circuit software program. These files summarize the applicable file types supported and are loaded by the single common circuit data interface for display in the Circuit File Type list box 8. There is an Attribute.XYZ file 3 for each file type supported by any circuit program and these files are loaded into the Circuit File Attribute list box 9 when a selection is made in the Circuit File Type list box 7. The "FileName".XYZ file 4 is either selected from the Circuit File Name list box 10 or is newly opened from the File menu. This file is used as a data holding tank to store all of the data that can be provided by any program in the circuit for the selected file type. A Circuit.XYZ file 5 exists in the local path of each circuit program and contains reference codes for assigning its data values to the correct position in the global "FileName".XYZ 4 file. The Circuit.SWT files 6 are also found in each circuit program path and are used to indicate whether the circuit is switched on and the current file type being circuited.

The process of circuiting data between software programs is shown in FIG. 2. This presents some of the detail program code necessary to accomplish the automatic transfer of data between circuit program in each step of the process. In step A. the Circuit.PRG file 1 is loaded first and the list names assigned to the Circuit Program list box 7. In step B. the Circuit.FIL file 2 is loaded from the local path of the selected circuit program and the list names assigned to the Circuit File Type list box 8. In step C. the correct Attribute.XYZ file 3 is determined and its list names assigned to the Circuit File Attribute list box 9. In step D. the "FileName".XYZ file 4 is either selected from the Circuit File Name list box 10 or is opened as a new file from the File menu. Then in step E. the Connect Circuit command button 12 is selected and a loop is performed to set all the Circuit.SWT files 6 in each circuit program path to indicate that the circuit is connected and what file type is being used. Additionally, step E. transfers all of the data that can be used by the circuit program into the local Circuit.XYZ file 5 for the current XYZ file type selected from the Circuit File Type list box 8.

The circuit program is then loaded in step F. and the Circuit.SWT 6 and Circuit.XYZ 5 files are loaded by the circuit program to indicate that the circuit is connected and what local data file type needs to be loaded for display in the circuit program. When changes are made to the data attributes in the circuit program, the Circuit.XYZ 5 file is updated and the switch in the Circuit.SWT 6 file modified as shown in step G. This indicates that new data is present which needs to be transferred to the other circuit programs. In Step H. the circuit program is unloaded or deactivated and then the Zergét Circuit is activated or loaded. Then, a search is made to determine if any data has been updated or modified by a circuit program. If so, the data is transferred to the local data files of each circuit program for use by any circuit program when selected.

The user interface of the single common circuit data interface to share data between software programs using the hard disk storage area of a general data processor is shown in FIG. 3. This shows the user interface for the process described in FIG. 2 using the file formats shown in FIG. 1. First the circuit program is selected from the Circuit Program list box 7 which loads the Circuit.PRG file 1. All available file formats for the selected circuit program are then displayed after loading the local Circuit.FIL file 2. The circuit file type is selected from the Circuit File Type list box 8 and the corresponding global Attribe.XYZ attribute file 3 is loaded into the Circuit File Attribute list box 9. A circuit file attribute is selected from the Circuit File Attribute list box 9 and its value is displayed in the Circuit Attribute Value text field 11. An existing circuit file "FileName".XYZ 4 is selected from the Circuit File Name list box 10 or can be newly created from the File menu before connecting the circuit. To connect the circuit, the Connect Circuit command button 12 is selected. This then updates the local Circuit.XYZ 5 decoding and storage files for each circuit program that supports the XYZ file type. As the circuit program is loaded or activated, it automatically loads the Circuit.SWT switch file 6 to determine if the circuit is connected so that the current circuit data can be loaded into the selected circuit program. Upon calculation or updating of the data in the circuit program, the Circuit.XYZ 5 decoding and storage file is updated accordingly. When the circuit program is unloaded or deactivated, the Zergét Circuit is activated and the updated data from the local Circuit.XYZ file 5 is transferred into the global "FileName".XYZ file 4 and into every other local Circuit.XYZ file 5. This summarizes all the attributes for a particular item in one file, and makes the current file data available to any other circuit program that is activated or loaded.

In summary, this process of automatically transferring data between software programs with the single common circuit data interface utilizing unique reference files allows the circuited software programs to perform as one program. This process could also be utilized for any category of software programs that need to share data to determine a final outcome.

What is claimed is:

1. An apparatus for sharing and transferring data between software programs residing on the hard disk storage area of a general data processor of known type so that said software programs continue to share and...transfer data without any further action required by a user comprising:

(a) a circuit software program programmed into said data processor to retrieve and display all data file attributes as they are determined or modified by said hard disk software programs on a display monitor for said data processor when a command to connect said hard disk software programs has been activated within said circuit software program, (b) A set of data file types programmed into said data processor that enable said processor to transfer data between said hard disk software programs for a selected said data file type in said circuit software program by updating the data in said data file types as data is modified by any of said hard disk software programs, and (c) switch files programmed into said data processor that are activated by said circuit software program to indicate that said data file types are to be loaded by said hard disk software programs when said hard disk software programs are loaded or activated as programmed to recognize said switch files and read and write all applicable data from and to said data file types using a common data file format, (d) said circuit software program operable for the updating of all said switch files and all said data file types in local paths of each of said hard disk software programs when any said hard disk software is deactivated or unloaded so that updated data from any said hard disk software program is transferred to said data file types of all said hard disk software programs connected by said circuit software program for loading said data file types into any of the said hard disk software programs as they are loaded or activated without any further action required by a user of said hard disk software programs until a command to disconnect said switch files has been selected within said circuit software program.

2. A method for sharing and transferring data between software programs residing on the hard disk storage area of a general data processor of known type so that said software programs continue to share and transfer data without any further action required by a user comprising the steps of:

(a) retrieving and displaying all data file attributes as they are determined or modified by said hard disk software programs on a display monitor for said data processor when a command to connect said hard disk software programs has been activated within a circuit software program programmed into said data processor, (b) transferring data between said hard disk software programs with said circuit software program by updating the data in said data file types as data is modified by any of said hard disk software programs for selected data file types programmed into said data processor, (c) activating switch files programmed into said data processor by said circuit software program to indicate that said data file types are to be loaded by said hard disk software programs when said hard disk software programs are loaded or activated as programmed to recognize said switch files and read and write all applicable data from and to said data file types using a common data file format, (d) updating all said switch files and all said data file types in local paths of each of said hard disk software programs when any said hard disk software is deactivated or unloaded so that updated data from any said hard disk software program is transferred to the data file types of all said hard disk software programs connected by said circuit software program, and loading said data file types into any of the hard disk software programs as they are loaded or activated without any further action required by a user of said hard disk software programs until a command to disconnect said switch files has been selected within said circuit software program.

\* \* \* \* \*